US007233595B1

(12) United States Patent
Hollis et al.

(10) Patent No.: US 7,233,595 B1
(45) Date of Patent: Jun. 19, 2007

(54) TRANSPORT OF ENCODED INFORMATION ACROSS A CORE NETWORK

(75) Inventors: Mark Alan Hollis, Park Orchards (AU); Juan Noguera-Rodriguez, Bromma (SE); Leslie Gary Graf, Balwyn (AU); Ian Rytina, Carlton (AU); Christian Norman Groves, Newport (AU); Stephen Terrill, Flemingatan (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1046 days.

(21) Appl. No.: 10/089,119

(22) PCT Filed: Sep. 27, 2000

(86) PCT No.: PCT/AU00/01170

§ 371 (c)(1),
(2), (4) Date: Jun. 10, 2002

(87) PCT Pub. No.: WO01/26323

PCT Pub. Date: Apr. 12, 2001

(30) Foreign Application Priority Data

Oct. 1, 1999 (AU) .................................. PQ 3190

(51) Int. Cl.
*H04L 12/28* (2006.01)
*H04L 12/56* (2006.01)
(52) U.S. Cl. .................. 370/395.2; 370/395.1; 370/395.6
(58) Field of Classification Search ............... 370/353, 370/401, 466, 474, 471
See application file for complete search history.

(56) References Cited

U.S. PATENT DOCUMENTS

| 6,026,086 | A  | * | 2/2000  | Lancelot et al. | ............ 370/353 |
| 6,349,197 | B1 | * | 2/2002  | Oestreich | ................... 455/63.1 |
| 6,374,112 | B1 | * | 4/2002  | Widegren et al. | ........ 455/452.2 |
| 6,434,151 | B1 | * | 8/2002  | Caves et al. | ............ 370/395.2 |
| 6,717,948 | B1 | * | 4/2004  | Subbiah | ................. 370/395.64 |
| 6,801,508 | B1 | * | 10/2004 | Lim | ........................ 370/310.1 |

FOREIGN PATENT DOCUMENTS

GB  2 326 317     12/1998
WO  WO 00/16433   3/2000

* cited by examiner

*Primary Examiner*—Wing Chan
*Assistant Examiner*—Warner Wong

(57) ABSTRACT

The present invention relates generally to the transport of information between telecommunications nodes. In one aspect, in a telecommunication system having a first network based on a first technology and a second network based on a second technology, the second network in communication with the first network, the present invention relates to providing a message encoding format profile functionality adapted to enable transport of encoded information along at least a portion of a path of communication established between the networks, including: mapping the encoded information from a first message having a first message encoding format to a second message having a second message encoding format wherein the mapping is performed in accordance with the following steps: a) determining message User-to-User Indication information; b) determining message Length Indicator information and; c) selecting a message encoding format based on the determination of steps a) and b), above. Preferably, the encoded information is AMR codec encoded information. The invention is suitable, for example, for use in the transmission of AMR encoded voice information to and from a mobile terminal in third-generation radio access networks across an ATM core network.

17 Claims, 1 Drawing Sheet

TRANSPORT OF ENCODED INFORMATION ACROSS A CORE NETWORK

BACKGROUND OF INVENTION

Field of Invention

The present invention relates generally to the transport of information between telecommunications nodes. In one aspect, the present invention relates to the transport of encoded information across a core network, and in particular to the transport of encoded information to and from an endpoint in an access network via a core network. The invention is suitable, in one aspect, for use in the transmission of AMR encoded voice information to and from a mobile terminal in third-generation radio access networks across an ATM core network and it will be convenient to hereinafter describe the invention in relation to that exemplary application. It should be appreciated, however, that the invention is not limited to that application, only.

The evolution of mobile communications systems and broadband multi-service networks are generally expected to merge in third-generation mobile systems that will provide global multimedia access to the mobile user. The concept referred to in Europe as the Universal Mobile Telecommunication System (UMTS) and globally as International Mobile Telecommunications in the year 2000 (IMT-2000) includes high-level access to multimedia services and evolution from second-generation mobile systems as key components. Standardization of this new system is carried out mainly by the 3rd Generation Partnership Project (3GPP) and the International Telecommunication Union—Telecommunication Standardization Sector (ITU-T).

UMTS/IMT-2000 separates the access functionality from the core network functionality, providing a common core network to support various types of access networks. Access Networks provide core-network-technology-independent access platforms for mobile terminals to all core networks and network services. In order to support the convergence of fixed and mobile telecommunications networks, a common core network for both fixed and mobile access is envisaged.

As a particular example of communication in access networks, the Adaptive Multi-Rate (AMR) speech codec has been specified by the European Telecommunications Standards Instituted (ETSI) for the Global System for Mobile Communication (GSM) cellular telecommunications system. The AMR speech codec aims to combine wireline speech quality with the capacity benefits of half-rate operation. Since this cannot be achieved under all conditions, an adaptive solution is necessary which tracks the rapidly changing radio conditions and local traffic levels. Accordingly, the AMR speech codec selects in real-time the type of channel (full-rate or half-rate) and, for each channel type, one of several codec bit rates. This allows the optimum combination of speech coding and channel coding bit-rates to be selected to meet the instantaneous radio channel conditions and the local capacity requirements. Whilst the AMR speech codec was initially aimed at GSM telecommunications systems, its high performance targets have resulted in the AMR speech codec being selected as the mandatory and default codec for use in UMTS.

At the same time, there is a limitation on the evolution of mobile communications systems and broadband multi-service networks in that, unfortunately, the core network transport protocols do not currently enable encoded information from access networks to be transported across a core network.

SUMMARY OF INVENTION

It would therefore be desirable to provide means for facilitating communication of encoded information between various nodes or endpoints in access networks separated by a core network.

In one aspect the present invention provides in a telecommunication system having a first network based on a first technology and a second network based on a second technology, the second network in communication with the first network, a method of providing a message encoding format profile functionality adapted to enable transport of encoded information along at least a portion of a path of communication established between the networks, the method including:

mapping the encoded information from a first message having a first message encoding format to a second message having a second message encoding format wherein the mapping is performed in accordance with the following steps:

a) determining message User-to-User Indication information;

b) determining message Length Indicator information, and;

c) selecting a message encoding format based on the determination of steps a) and b), above.

Preferably, the step of mapping is based on logical mapping and preferably, the step of logical mapping includes bit stuffing.

In another aspect, the present invention provides in a telecommunication system having a first network based on a first technology and a second network based on a second technology, the second network in communication with the first network;

a message encoding format profile functionality adapted to enable transport of encoded information along at least a portion of a path of communication established between the networks, the profile functionality including:

mapping means for mapping the encoded information from a first message having a first message encoding format to a second message having a second message encoding format wherein the mapping is performed in accordance with the following steps:

a) determining message User-to-User Indication information;

b) determining message Length Indicator information, and;

c) selecting a message encoding format based on the determination of a) and b), above, and;

message creation means for creating the second message having a message encoding format in accordance with the encoding format selected in c).

Preferably, the second network is an ATM core network.

Preferably, the ATM network includes an AAL2 Adaptation layer.

Preferably, the AAL2 adaptation layer includes an I.366.2 Service Specific Convergence Sublayer.

Preferably, the first network is an access network. The first network may, for example, be a Public Land Mobile Network PLMN.

Preferably, the first network is a radio access network.

Preferably, the radio access network is a UMTS access network.

Preferably, the message encoding format profile functionality is located in a node of the core network.

Preferably, the node is a UMSC of the core network.

Preferably, the encoded information is AMR codec encoded information.

Preferably, a telecommunication system including the message encoding format profile functionality, further includes a third network based on the first technology, in communication with the second network, and wherein the message encoding format profile functionality is adapted to enable transport of encoded information along at least a portion of a path of communication established between the first and third networks.

In essence, the present invention realises that prior art networks do not provide support for transport of encoded information across core networks when communicating with access networks. In the present invention, it is proposed that the encoded information from an access network is interworked or mapped into the existing core technology transport mechanism by providing a profile functionality between the dissimilar message formats. An advantage of the present invention is that the profile functionality allows for endpoints or nodes separated by a core network to communicate more effectively and negotiate and agree on parameters of communication.

A further aspect of the present invention provides a method of transporting encoded speech information to and from a first endpoint in an access network across an ATM core network, said access network being connected to said core network via first telecommunications node, said method including:

(a) generating an AMR encoded packet at said first endpoint from a digitised speech signal;

(b) transmitting said AMR encoded packet to said first telecommunications node, (c) mapping the contents of said AMR encoded packet at said first telecommunications node into an ATM Convergence Sublayer Protocol Data Unit; and (d) transmitting said ATM Convergence Sublayer Protocol Data Units across said core network to said second telecommunications node;

(e) reconstructing said AMR encoded packet from said ATM Convergence Sublayer Protocol Data Unit at a second telecommunications node within or at an interface to said ATM core network.

The ATM Convergence Sublayer Protocol Data Units may be transported across the ATM core network as AAL2 Common Part Sublayer Packets, such as I.366.2 Type 1 packets.

Another aspect of the present invention provides a telecommunications system including:

one ore more access networks connected to an ATM core network, a first endpoint in communication with said core network via said a first of said access networks, and first and second telecommunications nodes both of which are within or at interfaces to said ATM core network, wherein said first endpoint acts to generate an AMR encoded packet at said first endpoint from a digitised speech signal and transmits said AMR encoded packet to said first telecommunications node, and wherein said first telecommunications node acts to map the contents of said AMR encoded packet into an ATM Convergence Sublayer Protocol Data Unit and transmits said ATM Convergence Sublayer Protocol Data Unit across said core network to said second telecommunications node for reconstruction of said AMR encoded packet.

Yet another aspect of the present invention provides a first telecommunications node for use in a telecommunications system including one or more access networks connected to an ATM core network, a first endpoint in communication with said core network via a first of said access networks, and a second telecommunications node, said first and second telecommunications nodes both being within or at interfaces to said ATM core network, wherein said first endpoint acts to generate an AMR encoded packet from a digitised speech signal and transmits said AMR encoded packet to said first telecommunications node, wherein said first telecommunications node includes:

processing means to map the contents of said AMR encoded packet into an ATM Convergence Sublayer Protocol Data Unit, and transmission means to transmit said ATM Convergence Sublayer Protocol Data Unit across said core network to said second telecommunications node for reconstruction of said AMR encoded packet from said ATM Convergence Sublayer Protocol Data Unit.

BRIEF DESCRIPTION OF DRAWINGS

The following description refers in more detail to the various features of the present invention. To facilitate an understanding of the invention, reference is made in the description to the accompanying drawings where the invention is illustrated in a preferred, non-limiting embodiment.

In the drawings.

DESCRIPTION OF PREFERRED EMBODIMENT

Figure 1:
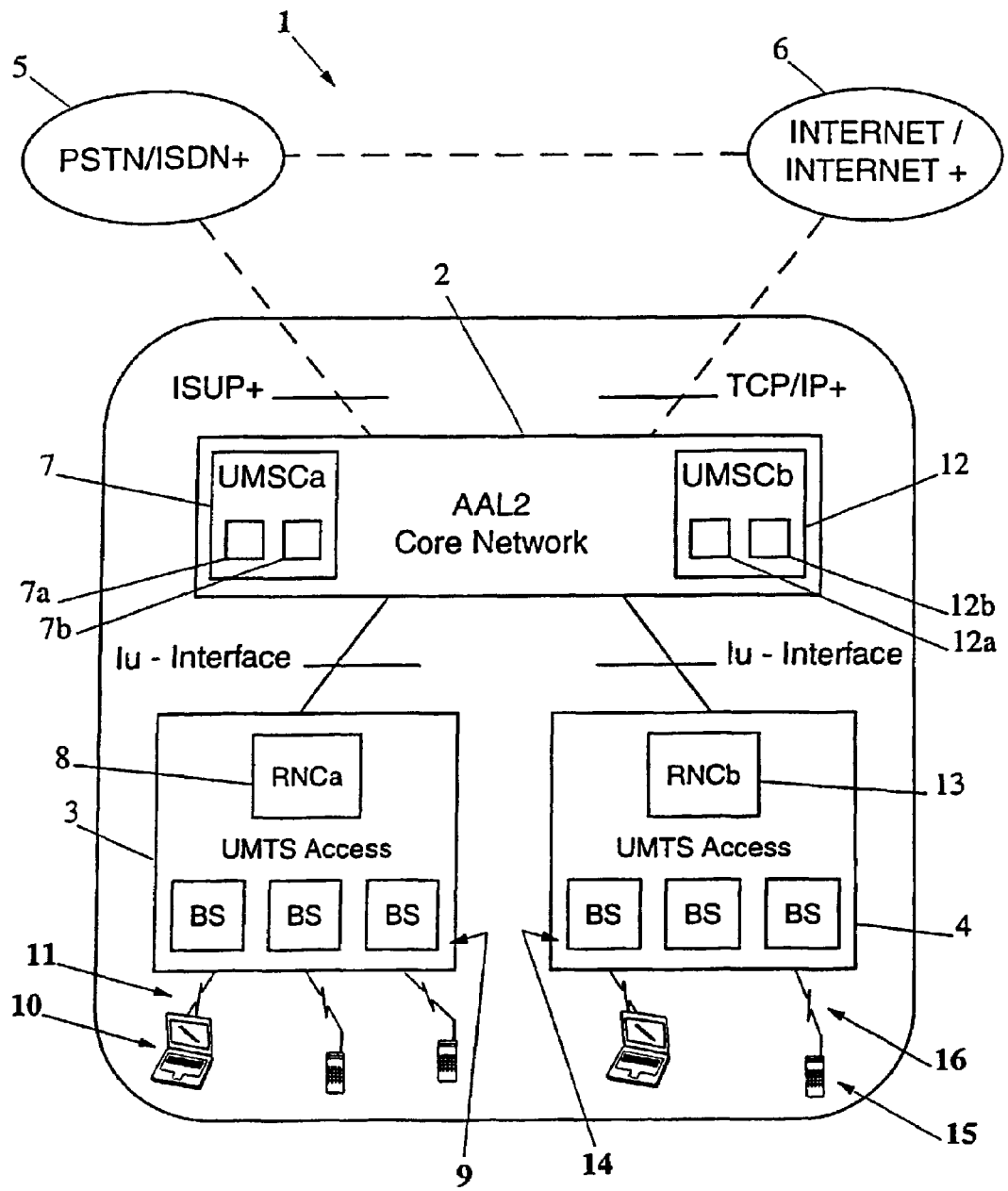
FIG. 1 is a schematic diagram illustrating a cellular system including an ATM core network interconnecting fixed and mobile access networks.

Referring to FIG. 1, there is shown generally a schematic representation of third-generation cellular system 1 including an ATM core network 2 which has two parallel UMTS Terrestrial Radio Access Networks (UTRANs) 3 and 4 linked to it. Additionally, two fixed networks are linked to the ATM core network 2, namely a PTSN/ISDN+ network 5 and an internet/intranet+ network 6. The core network 2 acts to transport information between telecommunications nodes or endpoints forming part of or in communication with any of the networks 3 to 6.

The ATM core network 2 includes at least a first Universal Mobile Telecommunications System Mobile Switching Center (UMSCa) 7 connected to the UTRAN 3 across an interface known as the Iu-interface. The UTRAN 3 includes at least a first Radio Network Controller (RNCa) 8 and Base Stations (BS) 9 connected to them. Mobile Terminals 10 communicate with the Base Stations 9 across an air interface 11. Similarly, the ATM core network 2 also includes at least a second Universal Mobile Telecommunications System Mobile Switching Center (UMSCb) 12 connected to the UTRAN 4 across an Iu-interface. The UTRAN 4 includes at least a first Radio Network Controller (RNCb) 13 and Base Stations (BS) 14 connected to them. Mobile Terminals 15 communicate with the Base Stations 14 across an air interface 16.

The UMSCa 7 includes processing means 7a for controlling its various functions, including data mapping, reconstruction, manipulating and switching, and transceiving means 7b for transmitting and receiving information to and from other nodes or endpoints in the cellular system 1. The UMSCb 12 similarly includes processing means 12a and transceiving means 12b.

The Base Stations 9 and 14 contain equipment for transmission and reception of information to and from the Mobile Terminals 10 and 15, as well as equipment for encryption/decryption, signal strength measurement and for communication with the Radio Network Controllers 8 and 13. The Radio Network Controllers 8 and 13 set up radio channels for voice and other traffic and for signaling to the UMSCs 7 and 12, and monitor the access network portion of connections established. The UMSCs 7 and 12 serve as an interface to the ATM core network 2 and beyond to other access networks, and control the operation of the Radio Network Controllers 8 and 13.

Each of the Mobile Terminals 10,15 includes an Adaptive Multi-Rate (AMR) Speech Coder-Decoder (Codec) for converting analog speech to and from digital information suitable for transport across a first of the access networks 3 to 6, the ATM core network 2 and finally a second of the access networks 3 to 6.

ADAPTIVE MULTI-RATE (AMR) SPEECH CODER-DECODER (CODEC)

The AMR Speech Codec consists of a multi-rate speech coder, a source controlled rate scheme including a voice activity detector and a comfort noise generation system, and an error concealment mechanism to combat the effects of transmission errors and lost packets. The multi-rate speech coder is a single integrated speech codec with eight source rates from 4.75 kbits/sec to 12.2 kbits/sec, and a low rate background noise encoding mode. The speech coder is capable of switching its bit-rate every 20 ms speech frame upon command.

During operation of the cellular system 1, the speech encoder of one of the Mobile Terminals 10,15 may take its input as a Pulse Coded Modulated (PCM) signal from the audio part of that Mobile Terminal. The AMR encoded speech at the output of the speech encoder is packetised and sent to the UMSCa 7 via the RNCa 8. The AMR codec has eight possible modes of operation in active mode plus one mode of operation in passive mode (comfort noise during silence periods). It outputs a block of bits every 20 ms and can switch between modes on a per frame basis. As indicated in Table 1 below, the number of bits in each block depends on the mode of operation.

TABLE 1

Block Size for each AMR Mode

| AMR Codec Mode | Speech bits | Class A bits | Class B bits | Class C bits |
|---|---|---|---|---|
| AMR 12.2 | 244 | 81 | 103 | 60 |
| AMR 10.2 | 204 | 65 | 99 | 40 |
| AMR 7.95 | 159 | 75 | 84 | 0 |
| AMR 7.4 | 148 | 61 | 87 | 0 |
| AMR 6.7 | 134 | 55 | 79 | 0 |
| AMR 5.9 | 118 | 55 | 63 | 0 |
| AMR 5.15 | 103 | 49 | 54 | 0 |
| AMR 4.75 | 95 | 39 | 56 | 0 |
| Speech Pause (1.8 kbits/s) | 35 | N/A | N/A | N/A |

The blocks for active modes are divided into three categories, or sub-blocks, of bits (A, B and C) with different relative importance. Class A bits carry most of the encoded information and therefore require high protection. Class B and C bits carry a smaller amount of information and require less or no protection. Corrupted class A sub-blocks are either provided to the decoder in the User Equipment receiving the AMR encoded packet with an indication of their level of corruption or are discarded. Corrupted class B and C sub-blocks can be passed to the decoder without indication of their level of corruptness.

In the "Speech Pause" mode, the encoder generates three types of frames, namely an SID_First frame, and SID_Update frame or a No_Data frame. The SID_First frame indicates the beginning of a silence period and contains no useful data. The SID_Update frame carries comfort noise, which is calculated over a period of 8 frames (160 ms) and sent every eighth frame. No_Data frames are generated by the AMR encoder during silence periods every 20 ms between SID_Update frames. They contain no useful information and are not transmitted over either of the UTRANs of FIG. 1.

TRANSPORT OF AMR ENCODED INFORMATION ACROSS AN ATM CORE NETWORK

The AMR encoded speech is transported to and from one of the Mobile Terminals 10 to one of the Mobile Terminals 15, and vive-versa, across the ATM core network 2. In the example illustrated in FIG. 1, the ATM core network 2 uses the ATM Adaptation Layer Type 2 (AAL2) transmission protocol, which provides for bandwidth-efficient transmission of low-rate, short and variable length packets in delay sensitive applications. AAL2 is divided into a Common Part Sub-Layer (CPS) and a Service Specific Convergence Sub-Layer (SSCS). The purpose of the SSCS is to convey narrow-band calls consisting of voice, voiceband data, or circuit mode data as Convergence Sublayer Protocol Data Units. Different SSCSs have been defined to support specific AAL2 user services, or groups of services. One such SSCS is defined in the ITU-T Recommendation I.366.2, otherwise known as I.trunk. ATM Convergence Sublayer Protocol Data Units may be transported across the ATM core network as AAL2 Common Part Sublayer Packets, such as I.366.2 Type 1 packets.

Figure 2:
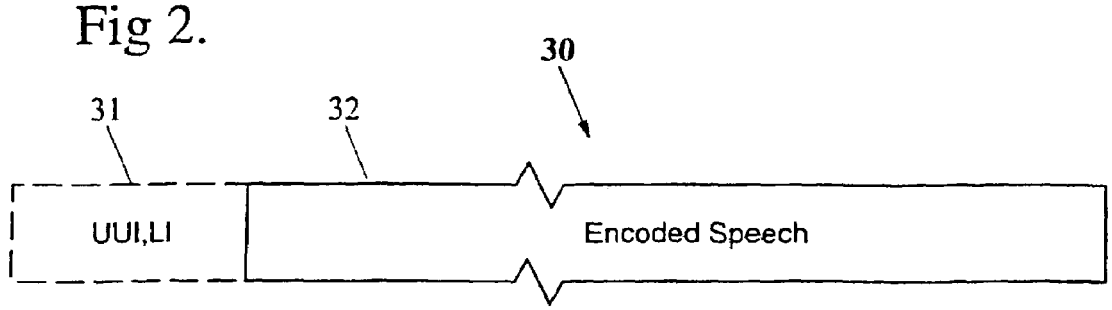
FIG. 2 is a schematic diagram showing the structure of a CPS-Packet used to transport AMR encoded information over the ATM core network of FIG. 1.

When the AMR encoded speech packet is received at the UMSCa 7 from one of the Mobile Terminals 10, its contents are mapped by the processing means 7a of the UMSCa 7 into an I.366.2 Type 1 packet. An illustration of an I.366.2 Type 1 packet 30 is shown in FIG. 2. The I.366.2 Type 1 packet 30 includes a packet header 31 and a payload 32. The payload 32 has a variable length up to a maximum of 45 octets. The packet header 31 includes a User-to-User Indication (UUI) and a Length Indicator (LI).

A UUI codepoint range of 0–15 is selected for the I.3662 Type 1 packet 30. Codepoints in this range indicate to nodes within the cellular network 1 that the payload 32 contains encoded audio information. For speech and other audio, the encoding format is an SSCS parameter of operation which must be agreed to between the USMCa 7 and the UMSCb 12 prior to transmission of the I.366.2 Type 1 packet 30.

The particular encoding format used by the UMSCs 7 and 12 for each of the AMR Codec Modes shown in Table 1 is characterised by a predetermined encoding format profile. Encoding format profiles are mappings that inform the receiver of an I.366.2 Type 1 packet 30 how to interpret the packet content. By making reference to the identifiers of these profiles, the UMSCa 7 and the UMSCb 12 can agree on one of the major operating parameters of the SSCS. An exemplary predefined profile referencing explicit packet formats is shown below in Table 2. The table lists standard ETSI-defined AMR Encoding Data Unit (EDU) formats to be used by the UMSCa 7 and the UMSCb 12. Details of the AMR EDU formats have not been included in this description, but are readily available from ETSI Technical Specifications.

packet for transmission by the transceiving means 12b to the RNCb 13, and ultimately one of the Mobile Terminals 15.

It is to be understood that various modifications and/or additions may be made to the aforementioned method and system without departing from the ambit of the present invention.

For example, the cellular system shown in FIG. 1 may include elements of second and/or third generation cellular systems, such as a GSM, D-AMPS, IS-136 or other radio access networks.

TABLE 2

AMR Encoding Format Profile

| UUI Code-point Range | Packet Length (Octets) | Encoding Format Reference | Description of Encoding Algorithm | M | Packet Time (ms) | Sequence Number Interval (ms) |
|---|---|---|---|---|---|---|
| 0–15 | 31 | AMR 12.2 EDU format | AMR 12.2 | 1 | 20 | 20 |
| 0–15 | 26 | AMR 10.2 EDU format | AMR 10.2 | 1 | 20 | 20 |
| 0–15 | 21 | AMR 7.95 EDU format | AMR 7.95 | 1 | 20 | 20 |
| 0–15 | 19 | AMR 7.4 EDU format | AMR 7.4 | 1 | 20 | 20 |
| 0–15 | 18 | AMR 6.7 EDU format | AMR 6.7 | 1 | 20 | 20 |
| 0–15 | 16 | AMR 5.7 EDU format | AMR 5.9 | 1 | 20 | 20 |
| 0–15 | 14 | AMR 5.1 EDU format | AMR 5.15 | 1 | 20 | 20 |
| 0–15 | 13 | AMR 4.75 EDU format | AMR 4.75 | 1 | 20 | 20 |
| 0–15 | 2 | AMR SID_First EDU format | AMR ID_First[x] | 1 | — | — |
| 0–15 | 6 | AMR SID_Update EDU format | AMR S50 ID_Update[x] | 1 | 160 | 160 |
| 0–15 | 1 | AMR No_Data EDU format | No-Data | 1 | 20 | 20 |

An AMR EDU is an octet-aligned concatenation of the frames of an AMR audio algorithm entailing a specific format of bits. Every AMR encoded audio packet contains an integral number of EDUs. It will be observed, however, that the size of speech frames of the AMR is not octet aligned for all modes of operation, and for this reason bit stuffing is used in some AMR Codec Modes to achieve octet frame structure for the AMR frame.

The definitions of the profile shown in table 2 includes the following information for each AMR Codec Mode: UUI codepoint range, packet length, reference to the EDU format, description of the algorithm, value of "M" (the number of service data units in an AMR packet), packet time and sequence number interval.

Upon receipt of the I.366.2 Type 1 packet 30 by the UMSCb 12, the processing means 12a of the UMSCb 12 extracts the AMR encoded speech information from the I.366.2 Type 1 packet by comparison of the payload of the packet 30 with the encoding format profile and detailed bit allocations stored in the UMSCb 12 previously agreed to with the UMSCa 7. The processing means 12b of the UMSCb 12 then reconstructs a corresponding AMR encoded Moreover, whilst a Type 2 Adaptation Layer is used in the ATM core network 2 or described above, it is envisaged that other types of adaptation layers, and other types of ATM Convergence Sublayer Protocol Data Units, may be used in conjunction with the invention to transport AMR encoded packets across an ATM core network.

The invention claimed is:

1. A method for use in a telecommunication system having a first network based on a first technology and a second network based on a second technology, the second network in communication with the first network; the method comprising providing a message encoding format profile functionality adapted to enable transport of encoded information along at least a portion of a path of communication established between the networks; and mapping the encoded information from a first message having a first message encoding format to a second message having a second message encoding format wherein the mapping is performed in accordance with table entries as follows:

| UUI Code-point Range | Packet Length (Octets) | Encoding Format Reference | Description of Encoding Algorithm | M | Packet Time (ms) | Sequence Number Interval (ms) |
|---|---|---|---|---|---|---|
| 0–15 | 31 | AMR 12.2 EDU format | AMR 12.2 | 1 | 20 | 20 |
| 0–15 | 26 | AMR 10.2 EDU format | AMR 10.2 | 1 | 20 | 20 |
| 0–15 | 21 | AMR 7.95 EDU format | AMR 7.95 | 1 | 20 | 20 |
| 0–15 | 19 | AMR 7.4 EDU format | AMR 7.4 | 1 | 20 | 20 |
| 0–15 | 18 | AMR 6.7 EDU format | AMR 6.7 | 1 | 20 | 20 |
| 0–15 | 16 | AMR 5.7 EDU format | AMR 5.9 | 1 | 20 | 20 |
| 0–15 | 14 | AMR 5.1 EDU format | AMR 5.15 | 1 | 20 | 20 |
| 0–15 | 13 | AMR 4.75 EDU format | AMR 4.75 | 1 | 20 | 20 |
| 0–15 | 2 | AMR SID_First EDU format | AMR ID_First[x] | 1 | — | — |
| 0–15 | 6 | AMR SID_Update EDU format | AMR S50 ID_Update[x] | 1 | 160 | 160 |
| 0–15 | 1 | AMR No_Data EDU format | No-Data | 1 | 20 | 20 |

2. The method as claimed in claim 1, wherein the mapping is based on logical mapping.

3. The method as claimed in claim 1, wherein the logical mapping includes bit stuffing.

4. In a telecommunication system having a first network based on a first technology and a second network based on a second technology, the second network in communication with the first network, a method of providing a message encoding format profile functionality adapted to enable transport of encoded information along at least a portion of a path of communication established between the networks, the method comprising:
   mapping the encoded information from a first message having a first message encoding format to a second message having a second message encoding format wherein the mapping is performed and
   performing the mapping step in accordance with table entries as follows:

| UUI Code-point Range | Packet Length (Octets) | Encoding Format Reference | Description of Encoding Algorithm | M | Packet Time (ms) | Sequence Number Interval (ms) |
|---|---|---|---|---|---|---|
| 0–15 | 31 | AMR 12.2 EDU format | AMR 12.2 | 1 | 20 | 20 |
| 0–15 | 26 | AMR 10.2 EDU format | AMR 10.2 | 1 | 20 | 20 |
| 0–15 | 21 | AMR 7.95 EDU format | AMR 7.95 | 1 | 20 | 20 |
| 0–15 | 19 | AMR 7.4 EDU format | AMR 7.4 | 1 | 20 | 20 |
| 0–15 | 18 | AMR 6.7 EDU format | AMR 6.7 | 1 | 20 | 20 |
| 0–15 | 16 | AMR 5.7 EDU format | AMR 5.9 | 1 | 20 | 20 |
| 0–15 | 14 | AMR 5.1 EDU format | AMR 5.15 | 1 | 20 | 20 |
| 0–15 | 13 | AMR 4.75 EDU format | AMR 4.75 | 1 | 20 | 20 |
| 0–15 | 2 | AMR SID_First EDU format | AMR ID_First[x] | 1 | — | — |
| 0–15 | 6 | AMR SID_Update EDU format | AMR S50 ID_Update[x] | 1 | 160 | 160 |
| 0–15 | 1 | AMR No_Data EDU format | No-Data | 1 | 20 | 20 |

5. A method as claimed in claim 4, wherein the step of mapping is based on logical mapping.

6. A method as claimed in claim 5, wherein the step of mapping includes bit stuffing.

7. A method of transporting encoded speech information to and from a first endpoint in an access network across an ATM core network, said access network being connected to said core network via first telecommunications node, said method comprising:
   (a) generating an AMR-encoded packet at said first endpoint from a digitized speech signal;
   (b) transmitting said AMR-encoded packet to said first telecommunications node,
   (c) mapping the contents of said AMR-encoded packet at said first telecommunications node into an ATM Convergence Sublayer Protocol Data Unit utilizing an AMR-encoding format profile, said mapping step including:
      (c)(1) determining message User-to-User Indication information;
      (c)(2) determining message Length Indicator information; and
      (c)(3) selecting the AMR-encoding format profile based on the determined User-to-User Indication information and the determined Length Indicator information;
   (d) transmitting said ATM Convergence Sublayer Protocol Data Unit across said core network to said second telecommunications node, said ATM Convergence Sublayer Protocol Data Unit including a header containing the User-to-User Indication information and the Length Indicator information; and
   (e) reconstructing said AMR-encoded packet from said ATM Convergence Sublayer Protocol Data Unit at a second telecommunications node within or at an interface to said ATM core network, wherein the second telecommunications node determines the AMR-encoding format profile based on the User-to-User Indication information and the Length Indicator information included in the header of the ATM Convergence Sublayer Protocol Data Unit.

8. A telecommunications system comprising:
   one or more access networks connected to an ATM core network;
   a first endpoint in communication with said core network via a first of said access networks; and
   first and second telecommunications nodes both of which are within or at interfaces to said ATM core network, wherein
   said first endpoint acts to generate an AMR-encoded packet at said first endpoint from a digitized speech signal and transmits said AMR-encoded packet to said first telecommunications node, and wherein
   said first telecommunications node includes:
      mapping means for mapping the contents of said AMR-encoded packet into an ATM Convergence Sublayer Protocol Data Unit, said mapping means including:
         means for determining message User-to-User Indication information;
         means for determining message Length Indicator information; and
         means for selecting an AMR-encoding format profile based on the determined User-to-User Indication information and the determined Length Indicator information; and
      means for transmitting the ATM Convergence Sublayer Protocol Data Unit across said core network to said second telecommunications node, said ATM Convergence Sublayer Protocol Data Unit including a header containing the User-to-User Indication information and the Length Indicator information, and wherein
   said second telecommunications node includes means for reconstructing the AMR-encoded packet by selecting the AMR-encoding format profile based on the User-to-User Indication information and the Length Indicator information included in the header of the ATM Convergence Sublayer Protocol Data Unit.

9. A first telecommunications node for use in a telecommunications system including one or more access networks connected to an ATM core network, a first endpoint in communication with said core network via a first of said access networks, and a second telecommunications node, said first and second telecommunications node both being within or at interfaces to said ATM core network, wherein said first endpoint acts to generate an AMR encoded packet from a speech signal and transmits said AMR encoded packet to said first telecommunications node, said first telecommunications node comprising:

processing means to map the contents of said AMR encoded packet into an ATM Convergence Sublayer Protocol Data Unit, said processing means including:

means for determining message User-to-User Indication information;

means for determining message Length Indicator information; and means for selecting an AMR-encoding format profile based on the determined User-to-User Indication information and the determined Length Indicator information; and transmission means to transmit said ATM Convergence Sublayer Protocol Data Unit across said core network to said second telecommunications node, said ATM Convergence Sublayer Protocol Data Unit including a header containing the User-to-User Indication information and the Length Indicator information for indicating to the second telecommunications node, the AMR-encoding format profile to be used for reconstruction of said AMR-encoded packet from said ATM Convergence Sublayer Protocol Data Unit.

10. An apparatus for enabling transport of adaptive multi-rate (AMR)-encoded packets from a radio access network across an synchronous transfer mode (ATM) core network, said apparatus comprising:

mapping means for mapping a first message containing AMR-encoded packets into a second message containing ATM Convergence Sublayer Protocol Data Units, wherein the AMR-encoded packets include an integral number of AMR Encoding Data Units (EDUs), said mapping means including:

means for determining message User-to-User Indication information;

means for determining message Length Indicator information; and means for selecting an AMR-encoding format profile based on the determined User-to-User Indication information and the determined Length Indicator information; and message creation means for creating the second message containing ATM Convergence Sublayer Protocol Data Units, each of said ATM Convergence Sublayer Protocol Data Units including a header containing the User-to-User Indication information and the Length Indicator information.

11. The apparatus as claimed in claim 10, wherein the mapping means utilized logical mapping.

12. The apparatus as claimed in claim 11, wherein the logical mapping includes bit stuffing.

13. The apparatus as claimed din claim 10, wherein the apparatus is located in a node of the ATM core network.

14. The apparatus as claimed in claim 13, wherein the node is a Universal Mode Telecommunications System Mobile Switching Center (UMSC) of the core network.

15. A method of enabling transport of adaptive multi-rate (AMR)-encoded packets from a radio access network across an asynchronous transfer mode (ATM) core network, said method comprising:

mapping a first message containing AMR-encoded packets into a second message containing ATM Convergence Sublayer Protocol Data Units, wherein the AMR-encoded packets include an integral number of AMR Encoding Data Units (EDUs), said mapping step including:

determining message User-to-User Indication information;

determining message Length Indicator information; and selecting an AMR-encoding format profile based on the determined User-to-User Indication information and the determined Length indicator information; and creating the second message containing ATM Convergence Sublayer Protocol Data Units, each of said ATM Convergence Sublayer Protocol Data Units including a header containing the User-to-User Indication information and the Length Indicator information.

16. The method as claimed in claim 15, wherein the step of mapping is based on logical mapping.

17. The method as claimed in claim 16, wherein the step of mapping includes bit stuffing.

\* \* \* \* \*